UNITED STATES PATENT OFFICE.

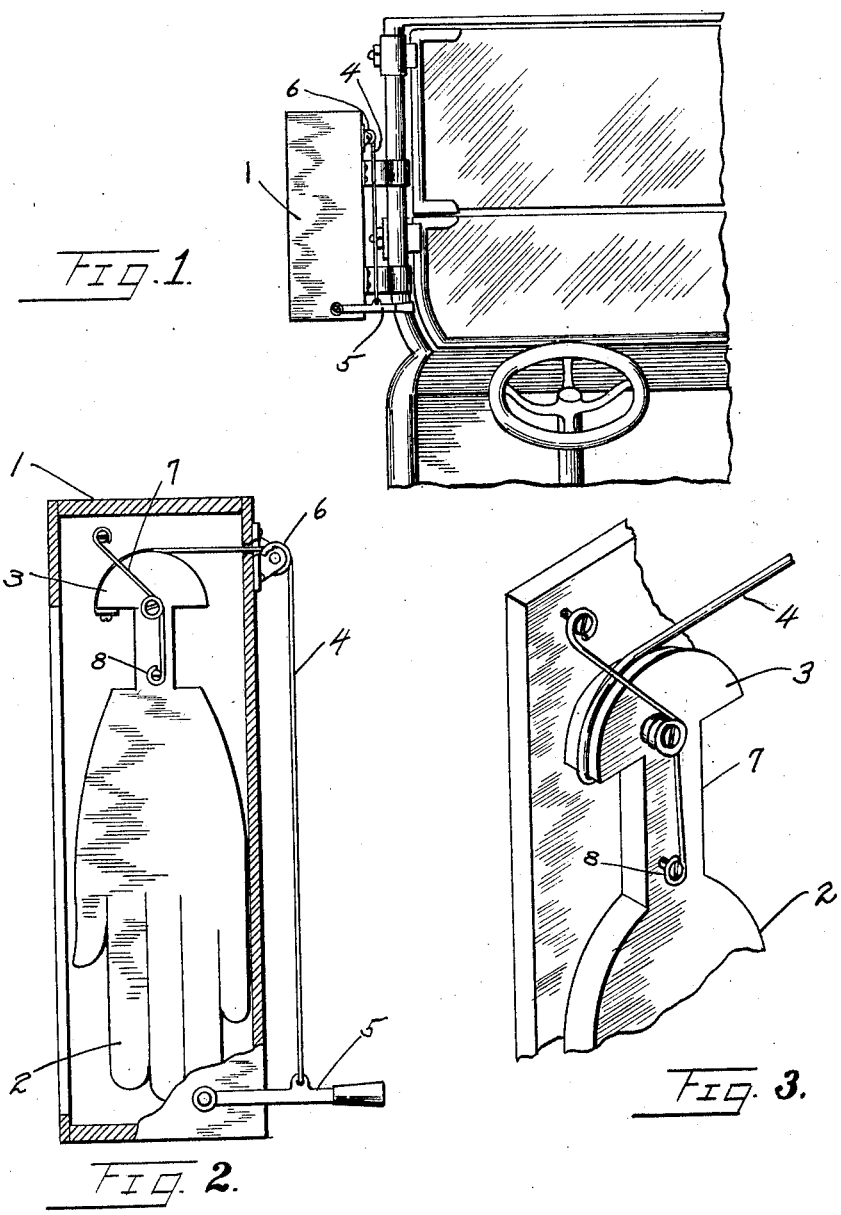

WILLIAM F. SHONK, OF DETROIT, MICHIGAN.

AUTOMOBILE-SIGNAL.

1,400,999.  Specification of Letters Patent.  Patented Dec. 20, 1921.

Application filed January 15, 1921. Serial No. 437,460.

*To all whom it may concern:*

Be it known that I, WILLIAM F. SHONK, a citizen of the United States, residing at Detroit, in the county of Wayne and State of Michigan, have invented certain new and useful Improvements in Automobile-Signals; and I do hereby declare the following to be a full, clear, and exact description of the invention, such as will enable others skilled in the art to which it appertains to make and use the same.

Traffic regulations of cities and towns generally require the drivers of vehicles to signal to the drivers of other vehicles when they are about to reduce speed, stop or make a turn so as to avoid a collision. If the vehicle is closed, proper signaling cannot be effected in the usual way by means of the hand.

This invention provides a signal for automobiles, motor and other vehicles capable of being readily operated at all times and under all conditions whether the vehicle is closed or open, since its action is not impaired or interfered with by curtains or other means for closing the vehicle when it is desired to be protected from wind or storm.

In accordance with the invention, the signal is disposed for effective display and is under control of the driver and operable at all times from within the vehicle so as to be projected into full view of the driver of a vehicle in the rear and thereby obviate an accident.

Other objects and advantages will be apparent and suggest themselves as the nature of the invention is understood.

While the drawings illustrate an embodiment of the invention, it is to be understood that in adapting the same to meet different conditions and requirements, various changes in the form, proportion and minor details of construction may be resorted to without departing from the nature of the invention.

Referring to the drawings hereto attached and forming a part of the specification, Figure 1 is a detail view of an automobile signal illustrating an adaptation of the invention, Fig. 2 is a sectional detail on the line $x$—$x$ of Fig. 1, and Fig. 3 is a detail view of a portion of the signal showing more clearly the spring coöperating with the pivoted signaling member.

Corresponding and like parts are referred to in the following description and designated in the several views of the drawings by like reference characters.

The signal embodies a casing 1 which houses the operating parts. The casing is adapted to be attached to any convenient portion of the vehicle to admit of unobstructed display of the signal. As indicated in Fig. 1 of the drawings, the casing 1 is attached to one side of the frame of the wind-shield. The signaling member 2 is pivotally disposed within the casing 1 so as to be concealed from view. The member 2 may be of any outline and preferably represents the human hand. A grooved segment 3 is provided at the pivoted end of the member 2 and concentric therewith. A wire or like part 4 coöperates with the groove segment 3 and is attached at one end to the member 2 and is connected at its opposite end to a lever 5, the latter being conveniently positioned for operation from within the vehicle. The wire or flexible connection 4 passes over a guide pulley 6. A spring 7 coöperates with the member 2 and holds the same within the casing 1 in closed position.

One end of this spring 7 is formed with a hook 8 which is adapted to engage the member 2. The parts 1 and 2 may be constructed of sheet metal or other suitable material.

A signal constructed in accordance with the invention will not detract from the appearance of the vehicle to which it is secured and may be manufactured at a comparatively small cost and is light and effective in operation and under the control of the driver at all times whether the vehicle is open or closed. The member 2 may be projected to any relative angle within the range of movement of the signal so as to impart any conventional information to the driver of a following vehicle so that he may be enabled to govern himself accordingly and thereby avoid any accidents.

Having thus described my invention what I claim is:

A signaling mechanism having a casing provided with a slot through one of its walls, a signaling member pivoted within the casing for projection through said slot, said member having a substantially straight signal head, a depressible lever on the exterior of the casing, a flexible element connected to said member and to said lever passing over said head and through a wall of the casing, and a return spring for the signaling member connected to the casing and to said member, and said flexible element being disposed for operation intermediate said spring and the adjacent wall of the casing to prevent detachment of the flexible element from the head.

In testimony whereof I affix my signature in presence of two witnesses.

WILLIAM F. SHONK.

Witnesses:
G. T. BAINBRIDGE,
W. A. BUTLER.